March 1, 1966 S. M. F. MAK ETAL 3,238,501

OPTICAL SCANNING PEN AND CODED-CHARACTER READING SYSTEM

Filed Aug. 29, 1962 4 Sheets-Sheet 1

INVENTORS:
Stephen M. F. Mak
Alfred S. Tauber
Samuel G. Lebow

By Louis A. Kline
John J. Matlago
Dominick Nardelli

Their Attorneys

OPTICAL SCANNING PEN AND CODED-CHARACTER READING SYSTEM

Filed Aug. 29, 1962 4 Sheets-Sheet 2

INVENTORS:
Stephen M.F. Mak
Alfred S. Tauber
Samuel G. Lebow
By Louis A. Kline
John J. Matlago
Dominick Nardelli
Their Attorneys

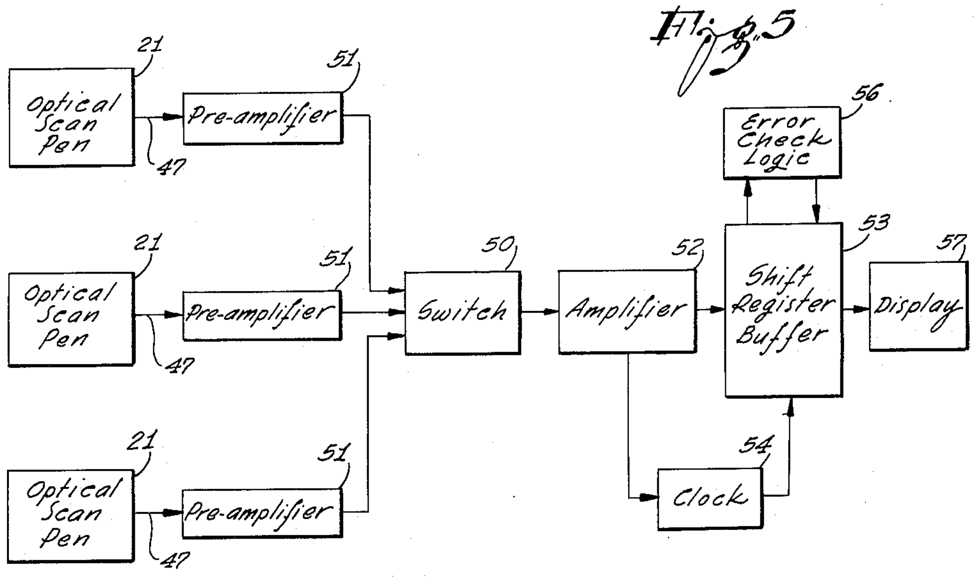
Fig. 5
Fig. 7a Fig. 7b Fig. 7c Fig. 7d
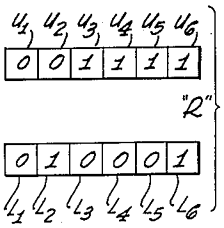
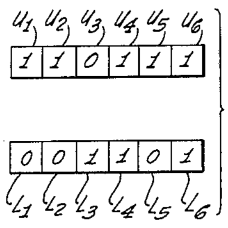
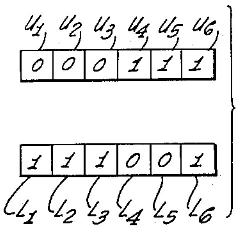
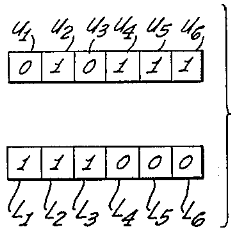
INVENTORS:
Stephen M. F. Mak
Alfred S. Tauber
Samuel G. Lebow
By Louis A. Kline
John J. Mutlago
Dominick Nardelli
Their Attorneys March 1, 1966 S. M. F. MAK ETAL 3,238,501

OPTICAL SCANNING PEN AND CODED-CHARACTER READING SYSTEM

Filed Aug. 29, 1962 4 Sheets-Sheet 4

INVENTORS
Stephen M. F. Mak
Alfred S. Tauber
Samuel G. Lebow
By Louis A. Kline
John J. Motlago
Dominick Nardelli
Their Attorneys 3,238,501
OPTICAL SCANNING PEN AND CODED-CHARACTER READING SYSTEM Stephen M. F. Mak and Alfred S. Tauber, Los Angeles, and Samuel G. Lebow, Santa Monica, Calif., assignors to The National Cash Register Company, Dayton, Ohio, a corporation of Maryland Filed Aug. 29, 1962, Ser. No. 220,194
18 Claims. (Cl. 340—146.3)

This invention relates to a character recognition and reading system and more particularly to a system in which a scanning and read pen is hand held and mannually moved across the characters whereby they are recognized and are transferred correctly to a display, for example, a punched paper tape.

Most systems that transfer or read characters automatically require that the characters be scanned at a given, constant, and steady rate which is determined by the design of the system. Therefore, the scanning rate should be synchronized with the rest of the systems and mechanical scanning readily solves this problem. If the scanning is to be performed manually, an operator cannot develop sufficient skill whereby he can always duplicate the mechanical scanning operation. A character recognition system using mechanically synchronized scanning is relatively expensive and mechanically complicated.

A principal object of this invention is to provide an improved, simple, economical, manually-operated coded-character recognition system whereby information is read and translated without human error.

Another object of this invention is to provide a hand held and manually operated scanning pen for reading coded-characters whose code is such as to permit the recognition system to be self-clocking not only by character but also self-clocking by bits forming a given character whereby the scanning pen could stop in the middle of a stroke and then continue the stroke and the characters would still be correctly read.

Optically operated character recognition systems are preferable over other systems in that any type of printed matter visible to the eye could be read by the system. Optical systems are known to be able to read at a relatively slow scanning rate and therefore are more adaptable to a manual scanning pen system and are able to read relatively smaller scale markings. An optical system to be operable should have a relatively high illumination factor and a high resolving power in order that the optical system distinguishes correctly between black type on white background and rejects smudges and imperfections in poor quality paper. High illumination and high resolving power are difficult to obtain in a small inexpensive system.

Therefore another object of this invention is to provide an improved high resolving power, small hand held, optical scanning pen for reading coded-characters optically whereby a wide tolerance in printing quality is permitted.

Another object of this invention is to provide coded-characters which when read incorrectly by a system, permits checking by the system after reading a complete character and then provides a signal if an error occurs.

Another object of this invention is to provide a logic system which detects reading errors when a fixed storage device is not properly filled with markings representative of characters and transfers to a display only correctly read information.

Briefly, the invention provides a manually-operated scanning pen that reads coded-characters optically. Each coded-character is space and time independent as it is printed in two forms or levels which are complements of each other. Then as the characters are manually scanned by a hand held scanning pen, a bit related clock pulse is produced that is also related to the unpredictable manual scanning rate. After each character is read and stored, each code level is compared with its complementary level for checking errors before the information is transferred to a display. The optical scan pen is made small so as to be easily handled for manual operation, yet provides sufficient light intensity and resolving power for reading the coded characters over wide ranges of contrast.

Additional objects and advantages of the invention will hereinafter be made apparent or will become apparent in the following description of a preferred exemplary physical embodiment as shown in the accompanying drawings, in which.

Figures 3, 3A, 4:
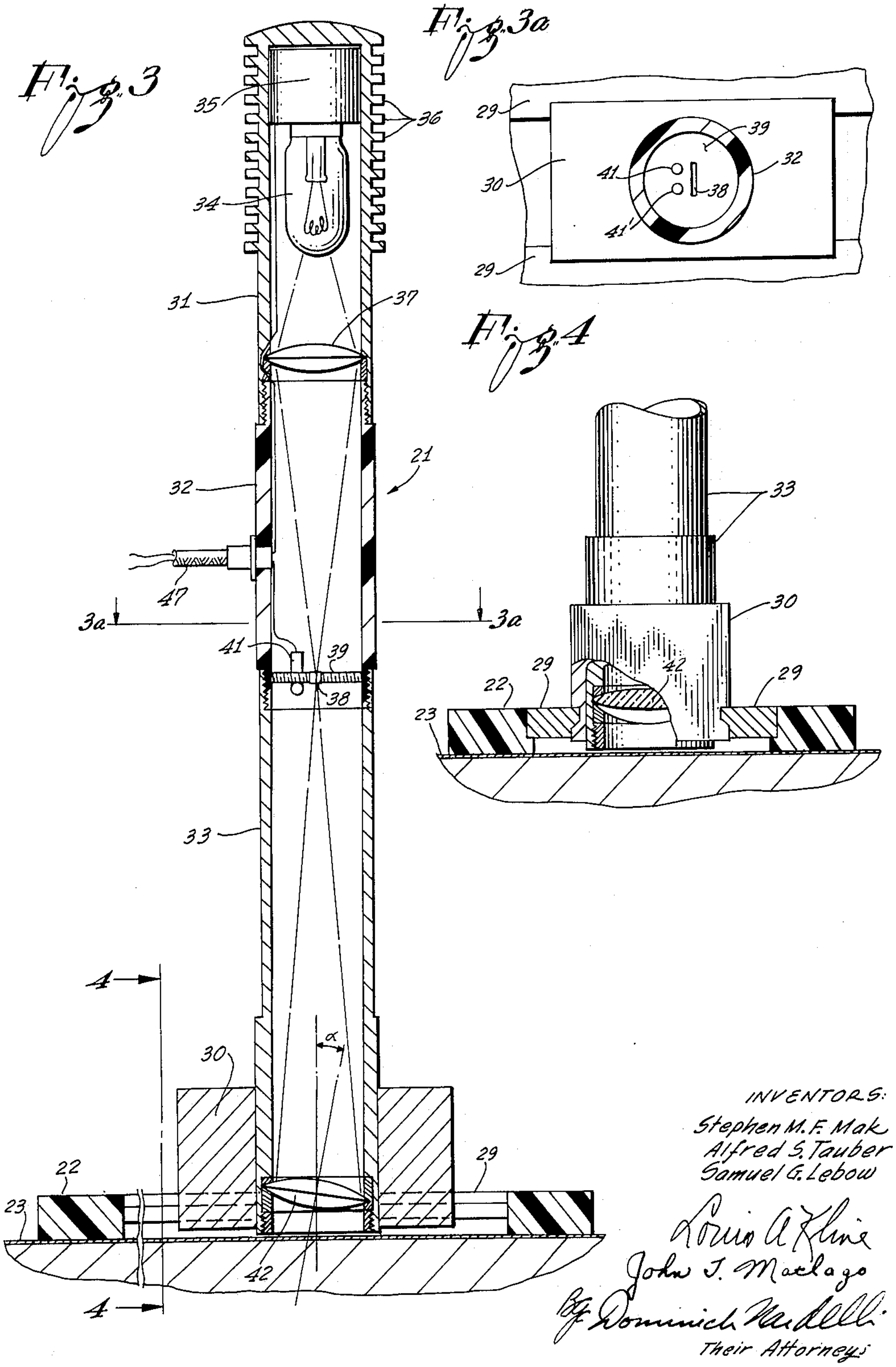
FIG. 3 shows a cross-section of an embodiment of the scanning pen taken in the direction of arrows 3—3 in FIG. 2.
Figure 6:
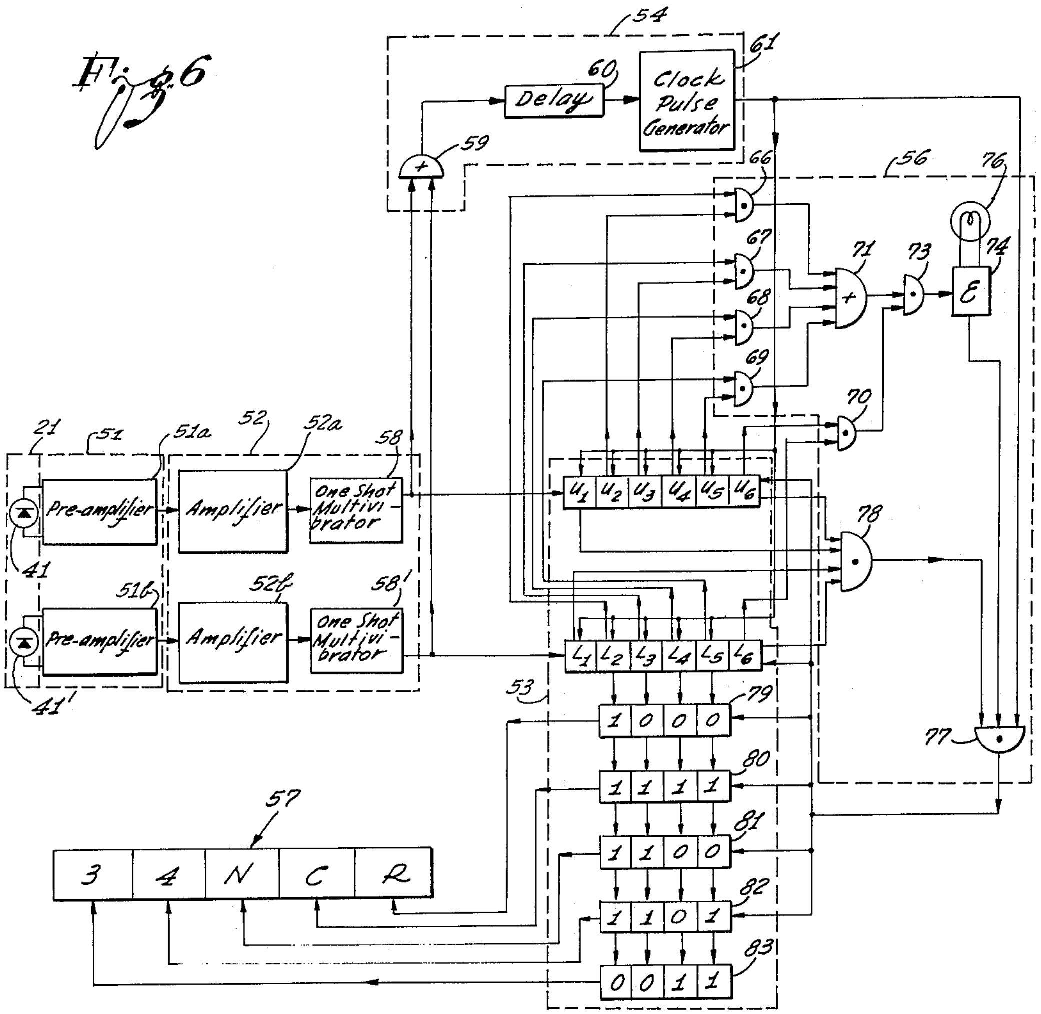

FIG. 3*a* is a cross-section taken on line 3*a*—3*a* in FIG. 3;

FIG 4 shows a section of the pen taken on line 4—4 of FIG. 3 in the direction of the arrows;

FIG. 5 shows a block diagram of the system incorporating the manually operated scanning pen;

FIG. 6 shows a more detailed schematic embodiment of the block diagram of FIG. 5; and FIGS. 7*a*, 7*b*, 7*c* and 7*d* indicate various types of binary readings as could be performed by the circuit of FIG. 6.

Figure 1:
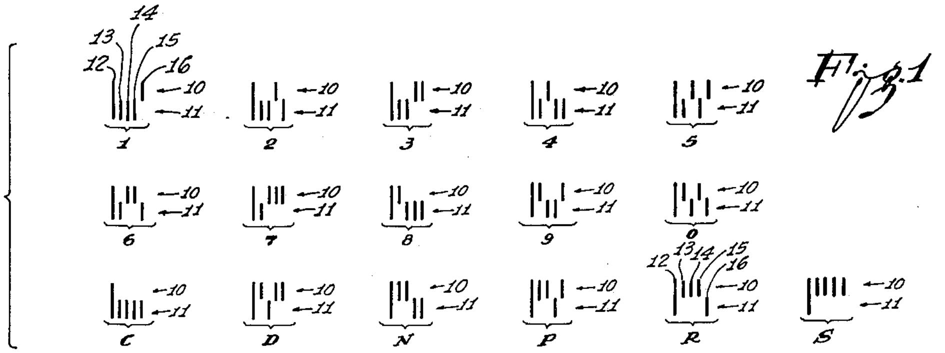
FIG. 1 is the preferred embodiment of coded-characters which are manually scanned by a suitable pen.

Referring to the drawings and to FIG. 1 in particular, a code is shown that characterizes 16 different characters, for example Arabic numerals 1, 2, 3, 4, 5, 6, 7, 8, 9, 0, and letters C, D, N, P, R, and S. Each coded-character is written in two levels, an upper lever 10, and a lower level 11. The upper level 10 of each coded-character is the complement of the lower level 11. Each coded-character is superseded by a character mark 12 or a binary digit one that is common to both levels of the code and each coded-character is distinguished, for example, by four information columns, such as columns 13, 14, 15, and 16 containing binary digit ones or bits which are (as observed) only half as long as the character mark 12 and are either in level 10 or 11 whereby one level is the complement of the other. The spacing between respective columns 12 to 16 as well as the width of the markings representing the binary digits are independent of each other. The upper level 10 is denoted as the information level. For example, when column 16 contains the only binary digit one or bit in this level, character "1" is distinguished, as shown, with a binary digit one in column 16 of level 10. The code for the other characters 2, 3, 4, 5, 6, 7, 8, 9, 0, C, D, N, P, R, and S is self explanatory. If more than 16 different characters are to be read, one or more columns could be added after column 16. The code, as shown, is a four-bit binary code.

The lower level 11 being the complement of the upper level 10 has a binary digit one or bit appearing in every column 13–16 in the lower level where no binary digit one or bit appears in the upper level. Thus, the two level code provides self-clocking capability for the system, as will be explained more fully hereinafter whereby the code is time and distance independent. In practice, a scanning pen that is manually stroked across the code with variations in scanning speed, could read the coded-characters accurately. In addition, the code provides freedom for printing of the code in various character widths.

Figure 2:
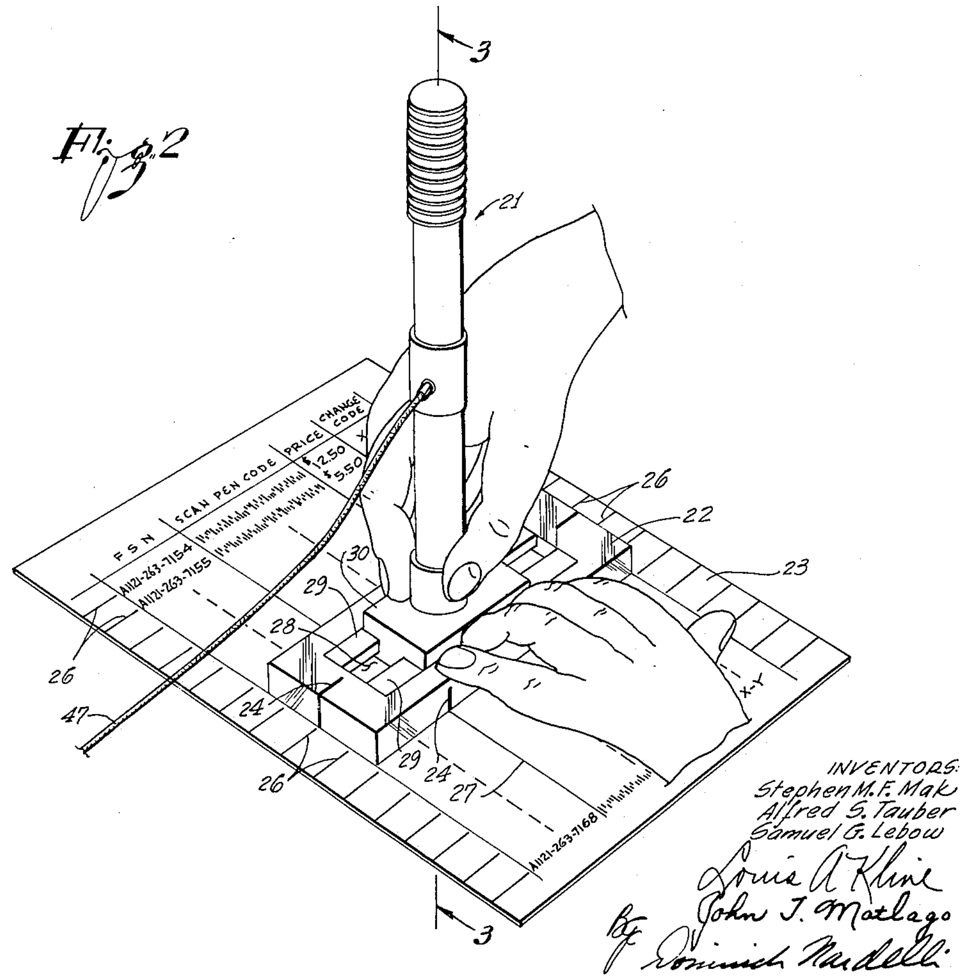
FIG. 2 shows a typical manually-operated, scanning pen used for reading coded-characters on a printed page.

Since the code is to be manually scanned a hand-operated scanning pen with special features is needed to scan the code correctly. Referring to FIG. 2, a scanning pen 21 is shown that is slidably mounted on a pen guide 22. The pen guide 22 is placed and held on a page 23 of printed information, for example, a catalog page. The page 23 contains thereon such printed information as a Stock No. (FSN), Price, and also the Scan Pen Code which is a code of the stock number and which is read by the pen 21. In practice the scan pen code is printed very small, for example, the height of character mark 12 is .094 inch, the height of the markings representing binary digits in columns 13, 14 15, and 16 is .047 inch, and the width and spacing between the markings representing binary digits is such that the space occupied by 12 coded-characters is less than one inch long. In order to make sure that the pen 21 reads the correct code, the guide 22 is provided with a series of lines or markers 24. The markers 24 that are disposed on opposite sides of the guide 22 are aligned as shown with suitable horizontal guide lines 26 in opposite margins of the paper. Thus, the pen 21 is oriented in the vertical position with the paper 23, as there is a separate horizontal guide line 26 for each line of printed matter. To orient the pen on the paper in the horizontal direction one of the guide lines 24 on the bottom edge of the guide 2 is aligned with a vertical line 27 on the paper 23. An operator can visually check the position of the pen by observing the stock number through a window 28 in the guide 22. The coded-characters are read by moving the pen from left to right in the normal direction a person reads a line.

The pen 21 is made to slide smoothly across the guide 22 by providing tracks 29 on opposite sides of the window 28. The tracks 29 engage slots in a base block 30 on the pen 21, more clearly shown in FIG. 4.

Referring to FIG. 3 the preferred scan pen 21 has optical reading features. The pen 21 has three tubular sections 31, 32, and 33. Upper section 31, since it contains a lamp 34 and socket 35, is metallic with cooling fins 36 to dissipate the heat from the lamp. Section 31 also contains a converging lens 37 that focuses the light from the lamp 34 onto an aperture 38 formed in a light shield 39 and disposed coaxially with the axis of the pen 21. Light shield 39 in turn is disposed transversely in the middle section 32 and near the lower end thereof. The section 32 is made of a material that is a good heat insulator, for example, plastic, since the shield 39 supports two photo-diodes 41 and 41' that are inherently temperature sensitive. The diodes 41 and 41', as shown in FIG. 3*a*, are disposed as close as possible to the aperture 38. Bottom section 33 of pen 21 which is fixed to base 30 contains at the lower end thereof another converging lens 42 which focuses the light passing through aperture 38 onto the paper to illuminate the coded-characters. Section 33 and base 30 prevent extraneous light from falling on the portion of the printed page containing the code.

The pen 21 functions as follows: the light from the lamp 34 is focused on the light shield 39 to a relatively small spot. The aperture 38 being in the path of the light spot allows light to pass through the shield 39. The aperture is preferably elongated as shown in FIG. 3*a* and disposed parallel to the character marks 12 of the code on paper 23. The lens 42 being located closer to the paper 23 than to the aperture 38, reduces the size of the aperture-image on the paper. The size of the aperture-image is sufficient to illuminate only one of the columns 12, 13, 14, 15, or 16 of the code in its upper and lower levels, thus explaining the orientation of the aperture 38. Then, as the pen 21 moves the aperture image shines on each column in succession. The lens 42 refocuses the reflected illuminated image on the paper back onto the light shield 39. This image on the light shield is larger than the image on the paper and the photo-diodes 41 and 41' being relatively close to the aperture 38 are able to detect varying degrees of contrast as the pen

21 moves along the paper 23. The photo-diodes 41 and 41' are aligned parallel to the aperture so that one diode observes the varying contrast in level 10 of the code and the other diode observes the varying contrast in the other level 11 of the code.

A well-known principle in the field of optics is that if a lens focuses light that is transmitted through an aperture onto a screen to illuminate an image, the image will be reflected from the paper and will be focused substantially on the aperture by the same lens. In the present embodiment, improved resolving power of the optical system is obtained by focusing the image substantially on the photo-diodes 41 and 41' instead of on the aperture 38 so that the diodes will see greater contrast and thereby reduce reading errors. In this embodiment of the pen the illuminated image is focused substantially on the off-set photo diodes by tilting the lens 42 whereby the lens' optical axis forms an angle with the pen axis or the light axis. A lens, because it has spherical surfaces, inherently has astigmatism, therefore when the optical axis of the lens 42 is tilted with respect to the pen axis the focal point of the image is shifted from the pen axis in the opposite direction from that in which the lens optical axis was rotated from the pen axis. The amount of shift in the focused image from the pen axis increases as the angle between the axes increases. An angle of 5° was found sufficient in the embodiment described. The pen 21 with only one tilted lens 42 is now able to provide an optical system whereby substantially all the light from the light bulb 34 placed behind the photo-diodes 41 and 41' is focused on the paper 23 disposed in front of the photo-diodes. An illuminated image is formed, and the image is then focused substantially on the two small photo-diodes 41 and 41'. The photo-diodes are placed in the pen 21 so that they do not screen the available light that is supplied by bulb 34 from the paper to be read.

The different sections 31, 32, and 33, the lenses 37 and 42, and the shield 39 are all suitably fastened together to make one rigid pen assembly 21.

The pulses as produced by photo-diodes 41 and 41' of the optical scan pen 21, are coupled by a flexible cable 47 to preferably a preamplifier and then to a remote automatic decoder and recorder system. Power to illuminate bulb 34 is also supplied through cable 47. Since a system that is capable of decoding the above code is expensive and large in comparison to the optical scan pen 21, a practical system would preferably contain one or more scan pens 21 which supply information to a central decoder system. For example, in a large scale operation wherein operators who order supplies for different departments are scattered throughout a large building, each operator has an optical scan pen on his desk ready for use. Since there is only one decoder system, only one pen 21 is handled at a time. An indicator that is turned on when one pen is in use is provided on the pens 21, for example, a red light (not shown).

Referring to FIG. 5, a block diagram is shown of a typical system for decoding and recording the information which system has more than one pen 21. Since the pulses from the photo-diodes 41 and 41' are relatively weak a preamplifier system 51 is supplied for each pen 21. The preamplifier system 51 is of small size and disposed on an operator's desk. The signals from the diodes 41 and 41' being now amplified to an acceptable level could travel a relatively large distance to a suitable central system. For example, the distance between the preamplifiers and the central system is such that the pen and preamplifier are located on the top floor of one office building and the central system is located in the basement of another building a few hundred feet away. The cables from each preamplifier system 51 are coupled to a common switch 50. Switch 50 is of a type that disconnects all but one pen 21 from an amplifier circuit 52 by actuating a button (not shown) on the particular pen 21 which is being used. The button turns on the red light on all the other pens 21. The amplified pulses or the information binary bits as produced by the amplifier 52 are transferred to a shift register buffer 53 and are synchronized by clock pulses that are produced by a clock 54. The clock is in turn synchronized by the amplifier 52 to produce a clock pulse everytime an information bit is produced. The information in the shift register is error checked by an error check logic 56. If there are no errors or omissions in the shift register the information is transferred to a display 57.

The operation and logic of the system as shown in a block diagram in FIG. 5 will be more fully explained with reference to FIG. 6 in which a preferred more detailed embodiment of the system is shown. As mentioned above each pen 21 has two photo-diodes 41 and 41' wherein one diode 41 scans the code's upper level 10 and the other diode 41' scans the code's lower level 11. When the pen 21 scans a code-line the photo-diodes 41 and 41' see a character mark 12 and each one produces an electrical pulse. The pulse from each diode is amplified by separate preamplifiers 51*a* and 51*b* which form the preamplifier circuit 51 of FIG. 5. The amplified pulses are again amplified in separate amplifiers 52*a* and 52*b*. Each amplified pulse then triggers on one of the one-shot multi-vibrators (MV) 58 and 58' respectively to produce the information binary digit one. The multivibrators and amplifiers comprise the amplifier circuit 52 of FIG. 5. The multivibrators have an on-duty cycle that is related to the maximum design scanning speed for the pen 21. A shorter on-duty cycle allows an operator to scan the code faster. The outputs of each one-shot MV 58 and 58' are fed to the clock 54 comprising the inputs of an OR gate 59, a delay line 60, and a clock pulse generator 61 to produce a first clock pulse that is delayed slightly from the time either one of the one-shot MV 58 or 58' is triggered on. Only one clock pulse is produced to indicate column 12 has been read. In the meantime, each one-shot MV 58 and 58' is coupled to the register 53 to trigger to a "one" state, flip-flops $U_1$ and $L_1$, respectively. The $U_1$ and $L_1$ flip-flops each represent the first of a series of flip-flops in two levels of reading flip-flops $U_1$ to $U_6$ and $L_1$ to $L_6$. In case the two pulses formed by reading the character bar 12 are not synchronized because the pen 21 was canted slightly with respect to the code-line, for example, the delay in forming the clock pulse ensures that both flip-flops $U_1$ and $L_1$ are triggered to the "one" state before the clock pulse is formed. The clock pulse is coupled to flip-flops $U_1$ to $U_5$ and $L_1$ to $L_5$ and causes the information in these flip-flops to shift serially one flip-flop to the right. Therefore, after the first clock pulse the flip-flops $U_2$ and $L_2$ should be the only flip-flops in the two levels that are in their "one" state and all the others are in their "zero" state.

If, for example, digit R follows the character mark 12, binary digit one or bit in column 13 would form a pulse in only diode 41 which in turn triggers only one-shot MV 58, triggers only flip-flop $U_1$ to its "one" state, and forms a delayed second clock pulse. This second clock pulse is also gated to flip-flops $U_1$–$U_5$ and $L_1$–$L_5$ to shift the information therein to the right wereby now only flip-flops $U_2$, $U_3$, and $L_3$ are in their "one" state. The binary digit one in column 14 also forms a pulse in diode 41 which again triggers only flip-flop $U_1$ to its "one" state, in turn forming a delayed third clock pulse to again cause the information in flip-flops $U_1$–$U_5$ and $L_1$–$L_5$ to shift serially to the right. The binary digit one in column 15 also forms a pulse in diode 41 which again triggers flip-flop $U_1$ to its "one" state, and forms a fourth clock pulse. This fourth clock pulse like the clock pulses before shifts the information in flip-flop $U_1$–$U_5$ and $L_1$–$L_5$ to the right. The binary digit one in column 16 being in level 11 now forms a pulse only in diode 41' to in turn trigger one-shot MV 58', to trigger only flip-flop $L_1$ to its "one" state, and to form a fifth clock pulse. After the fifth clock pulse is formed the information in flip-flops $U_2$–$U_6$ and $L_2$–$L_6$ should correspond to the pattern as shown in FIG. 7*a* where the digit "one" indicates those flip-flops which are in the "one" state and the digit "0" indicates those flip-flops which are in the "zero" state. It should be noted that everytime a column in the code was read by the diodes a synchronized clock pulse was produced which as mentioned before is the code's self-clocking capability, as the cyclic rate of the clock pulses is related to the code's spacing and scanning speed. Before the formation of the sixth clock pulse, the error logic circuit 56 checks the flip-flops $U_2$–$U_6$ and $L_2$–$L_6$ for reading errors.

Reading errors would take the following forms, for example, as in FIG. 7*b*, an error occurs when any one of flip-flop pairs $U_2L_2$, $U_3L_3$, $U_4L_4$, or $U_5L_5$ is in the "one" state, like both flip-flops in pair $U_4L_4$. Also, as in FIG. 7*d*, an error occurs when only one of the flip-flops in the last flip-flop pair $U_6L_6$ is in the "one" state after the fifth clock pulse. Furthermore, as in FIG. 7*c* an error occurs when after the next character mark 12 is read only one of the flip-flops in pair $U_1L_1$ is in the "one" state. Finally, an error is formed when any combination of these errors occurs, for example, as shown in FIG. 7*d*.

The error check logic circuit 56 of FIG. 5 includes, for example, five AND gates 66 to 70 (FIG. 6). The inputs of each AND gate 66 to 69 are connected to the "one" state of each flip-flop pair $U_2L_2$, $U_3L_3$, $U_4L_4$, and $U_5L_5$, respectively, which are the flip-flops that contain the binary code for the character being read. The inputs of AND gate 70 are connected to the "one" states of flip-flop pair $U_6L_6$. The outputs of the AND gates 66 to 69 are fed to the inputs of an OR gate 71 whose output in turn is fed to another AND gate 73. The error check logic 56 now checks for errors that occur when the information in the upper level flip-flop $U_2$ to $U_5$ is not the complement of the information in the lower level flip-flop $L_2$ to $L_5$ only after the fifth clock pulse. The instant of the fifth clock pulse is evidenced by flip-flop pair $U_6L_6$ being in their "one" state. Therefore, if the levels are not complements of each other, at least one of the AND gates 66 to 69 would pass a current through the OR gate 71. Since these flip-flops should be complements of each other only after a complete coded-character is read or after the fifth clock pulse, the time after the fifth clock pulse is determined when both flip-flops $U_6$ and $L_6$ are in their "one" state to pass a pulse through AND gate 70. Therefore, the output of AND gate 70 is also fed to the input of the other AND gate 73 together with the output of the OR gate 71. Now if both the AND gate 70 (indicating that a fifth clock pulse has been formed) and the OR gate 71 pass a pulse (indicating a reading error in the code), an error flip-flop 74 is switched to its error-state to light an error lamp 76. When lamp 76 is lit, an AND gate 77, whose function will be explained below, is closed because the no-error-state of the error flip-flop 74 is fed thereto.

After the pen reads the next character mark 12 of the code both flip-flops $U_1$ and $L_1$ are triggered to their first state. The first state of flip-flops $U_1$, $U_6$, $L_1$, and $L_6$ are fed to the input of an AND gate 78, and therefore, when these flip-flops are all in their "one" state, AND gate 78 passes a pulse to AND gate 77 since its output is fed thereto. The clock pulses are also coupled to the input of AND gate 77. Then at the sixth clock pulse and if the error lamp 76 is out, a pulse is passed through AND gate 77 to erase the information in the upper level flip-flops $U_2$ to $U_6$ and in the lower level flip-flops $L_2$ to $L_6$ to place them all in their zero state while at the same time transforming in parallel the information in flip-flops $L_2$ to $L_5$ to a row of first storage flip-flops 79. The information in each flip-flop $U_1$ and $L_1$, also at the sixth clock pulse is shifted to flip-flops $U_2$ and $L_2$, respectively to indicate that the sixth clock pulse is the first clock pulse of the next coded-character. The system is now ready to read the next character.

The above operation is repeated when reading the next character and at the sixth clock pulse again, if the error flip-flop 74 is in the no-error-state, the information in flip-flop $L_2$ to $L_5$ is again transferred to the first storage flip-flops 79 while the information contained therein before the sixth clock pulse is shifted in parallel to a row of second storage flip-flops 80. Three more rows of storage flip-flops (third, fourth, and fifth series 81, 82, and 83, respectively) are shown, to indicate a five column number is being read. If more than five columns are to be read then more than five rows of storage flip-flops are needed. If less than five columns are to be read, then less than five rows of storage flip-flops are needed.

The binary information in storage flip-flops rows 79 to 83 are decoded and displayed by the display 57.

As mentioned above other types of reading errors could be made by the pen 21, and these errors are also checked for by the error check logic 56. For example, if an error occurred as in FIG. 7*c* wherein flip-flop pair $U_1$ and $L_1$ are complements of each other, the AND gate 78 prevents transfer of the error to the storage flip-flops since AND gate 77 is closed. If the error occurs as in FIG. 7*d*, again AND gate 78 prevents transfer of the error to the storage. The reading flip-flops $U_2$ to $U_6$ and $L_2$ to $L_6$ are erased after each character readout to eliminate possibility of transferring a binary digit to the storage when a coded-character has not been completely read-out. If the display contains less digits than should have been read an error signal (not shown) could be used to indicate an error if an error occurs of the types, for example, as shown in FIG. 7*c* on reading the last character of the series, as the error lamp 76 is not lit by the error check logic 56 because flip-flops $U_2$ to $U_5$ are complements of $L_2$ to $L_5$.

The system disclosed is an exemplary embodiment, and variations of the logic and the features as disclosed herein may be made without departing from the invention. Changes and modifications would become evident to those skilled in the art after reading this specification, and accordingly the invention is not limited to the example disclosed.

What is claimed is:

1. In a manually scanned character reading system, a record medium having a plurality of coded-characters recorded thereon, manual scanning means for scanning said coded-characters and producing signals representative thereof, means for storing said signals, and error checking means for detecting errors in said signals as stored, said manual scanning means including a light source, a lens for focusing the light rays from said light source onto said record medium, and at least one light sensing means disposed on the same side of said lens as said light source to collect the light rays that are reflected from said record medium back through said lens to produce said signals.

2. In a manually scanned character reading system, a record medium having a plurality of coded-characters recorded thereon, a manually operable scanning pen for reading said coded-characters, means for producing electric impulses indicative of said coded-characters being read and including two circuits in which said electric impulses are formed, first and second storage means for respectively receiving and storing the electric impulses formed in said two circuits such that when said coded-characters are properly read the impulses stored therein will be complementary, said first and second storage means each also storing a like electric impulse indicative of the end of a coded-character, means responsive to said like electric impulse for transferring the stored impulses representing each character, in turn, out of at least one of said storage means, detecting means for detecting when the stored electric impulses of one of said storage means is not the complement of the stored electric impulses of the other storage means, and means responsive to said detecting means for preventing the transfer in the event the impulses stored in said first and second means are not complementary.

3. In the character reading system of claim 2 wherein said means for detecting errors includes a means for comparing the impulses in one of said circuits with the impulses in the other of said circuits, and wherein means are provided for producing an error signal when the impulses in said circuits are not complements of each other.

4. In the character reading system of claim 2 wherein a binary code is recorded on said record medium and is representative of said coded-characters, said binary code comprises binary digit marks formed in two levels, one of said levels being the complement of said other level, and a binary one digit character mark formed before and after a coded-character and common to said both levels.

5. In a manually-scanned character reading system, a record medium having a plurality of coded-characters recorded thereon; a manually-operable scanning pen for sensing said coded-characters and forming electric impulses in response thereto, said scanning pen also including guidable enclosure and support means for guiding and manipulating said pen across said record medium; means for producing electric impulses indicative of said coded-characters being read including two circuits in which said electric impulses are formed; first and second storage means for respectively receiving and storing the electric impulses formed in said two circuits such that when said coded-characters are properly read the impulses stored therein will be complementary; said first and second storage means each also storing a like electric impulse indicative of the end of a coded-character; means responsive to said like electric impulse for transferring the stored impulses representing each character, in turn, out of at least one of said storage means; detecting means for detecting when the stored electric impulses in one of said storage means is not the complement of the stored electric impulses in the other of said storage means; and means responsive to said detecting means for preventing the transfer in the event the impulses stored in said first and second storage means are not complementary.

6. In a manually-scanned character reading system, a record medium having a plurality of coded-characters recorded thereon, each recorded character being represented on said record medium by a binary code comprising binary digit marks formed in two levels, one of said levels being the complement of said other level, each character also including before and after the character a binary digit character mark formed in both levels; a manually-operable scanning pen for sensing said binary code and forming electric impulses in response thereto, said scanning pen also including guidable enclosure and support means for guiding and manipulating said pen across said record medium; means for producing electric impulses indicative of said coded-characters being read including two circuits in which said electric impulses are formed; first and second storage means for respectively receiving and storing the electric impulses formed in said two circuits such that when said coded-characters are properly read the pulses stored therein will be complementary, said first and second storage means each also storing a like electric impulse formed between each coded-character; means responsive to said like electric impulse for transferring the stored impulses representing each character, in turn, out of at least one of said storage means; detecting means for detecting when the stored electric impulses in one of said storage means is not the complement of the stored electric impulses in the other of said storage means; and means responsive to said detecting means for preventing transfer in the event the impulses stored in said first and second storage means are not complementary.

7. A manually operable scanning pen comprising means for sensing a binary code and forming electric impulses corresponding thereto, enclosure means for enclosing said means for sensing, a guide means for guiding said enclosure means across a record medium, and means for manually manipulating said enclosure means along said guide means and across said record medium.

8. The scanning pen of claim 7 wherein said means for sensing comprises a light source, a first lens for focusing said light on an aperture formed in a light shield with said light passing through said aperture, a second lens for focusing said light passing through said aperture onto a record medium to be scanned, a photo diode mounted on said light shield for intercepting the reflected light from said medium, and said second lens also focusing said reflected light whereby said photo diode sees contrasts in light intensity and produces electrical impulses related to the time variation of light and dark areas passing across the diode.

9. The scanning pen of claim 8 wherein said light source is disposed at one end of said enclosure means and on a first axis, and the record medium to be scanned is disposed at the other open end of said enclosure means, said first lens is disposed between said light shield and said light, said second lens is disposed between said light shield and the other open end of said enclosure means, said photo diode is disposed adjacent said aperture, said aperture and said first and second lens are disposed substantially on said first axis, and said second lens has its optical axis disposed at an angle with said first axis whereby the light from said aperture is focused on said record medium substantially in axial alignment with said first axis and the illuminated image on said record medium is focused on said photo diodes in substantially non-axial alignment with said first axis.

10. In a manually scanned character reading system, a record medium having a plurality of coded-characters recorded thereon, manual scanning means for scanning said coded-characters and producing electric impulses corresponding thereto, means for storing said electric impulses, means for detecting errors in the stored electric impulses, said manual scanning means comprising means for sensing said character and forming said electric impulses, enclosure means for said means for sensing, a guide means for guiding said enclosure means across said record medium, and means for manually manipulating said enclosure means along said guide means and across said record medium.

11. In a manually scanned character reading system, a record medium having a plurality of coded-characters recorded thereon, manual scanning means for scanning said coded-characters and producing electric impulses corresponding thereto, means for storing said electric impulses, means for detecting errors in the stored electric impulses, said manual scanning means comprising a light source, a first lens for focusing said light on an aperture formed on a light shield with said light passing through said aperture, a second lens for focusing said light passing through said aperture on said record medium to be scanned, and a photo diode mounted on said light shield for intercepting the reflected light from said medium, said second lens also focusing said reflected light from said medium onto said photo diode whereby said photo diode senses contrast in light intensity and produces said electric impulses related thereto.

12. In a manually-scanned character reading system, a record medium having a plurality of coded-characters recorded thereon; manual scanning means for scanning said coded-characters and producing electric impulses corresponding thereto; means for storing said electric impulses; means for detecting errors in the stored electric impulses; said manual scanning means comprising a light source, a first lens for focusing said light on an aperture formed on a light shield with said light passing through said aperture, a second lens for focusing said light passing through said aperture on said record medium to be scanned, and a photo diode mounted on said light shield for intercepting the reflected light from said medium, said second lens also focusing said reflected light from said medium onto said photo diode whereby said photo diode senses the contrast in light intensity and produces said electric impulses related thereto, said light source being disposed at one end of an enclosure means and on a first axis, said record medium to be scanned being disposed at the other open end of said enclosure means, said first lens being disposed between said light shield and said light source, said second lens being disposed between said light shield and the other open end of said enclosure means, said photo diode being disposed adjacent said aperture, said aperture and said first and said second lens being disposed substantially on said first axis, and said second lens having its optical axis disposed at an angle with said first axis whereby said aperture is focused on said record medium substantially in axial alignment with said first axis and the illuminated image on said record medium is focused on said photo diode in substantially non-axial alignment with said first axis.

13. A system for reading coded-characters on a record medium wherein said coded-characters form a binary code including binary digit marks formed in two levels, one of said levels being the complement of said other level, and a binary digit character mark formed before and after said coded-character and common to said both levels, said system comprising manual means for scanning said coded-characters for producing two groups of electrical impulses respectively corresponding to the binary digit marks formed in said two levels, first and second storage circuits for respectively storing the two groups of electrical impulses therein, clock means operable by said electrical impulses for producing clock pulses to arrange said electrical impulses in said storage means in time-spaced order, error means for detecting when the group of stored electrical impulses of one circuit is the complement of the group of stored electrical impulses of the other circuit, and means for transferring the impulses representing each character, in turn, out of said storage means in response to when said error means indicates that the group of stored electrical impulses of one circuit is the complement of the group of the stored electrical impulses of the other circuit.

14. A system for reading coded-characters on a record medium wherein said coded-characters form a binary code including binary digit marks formed in two levels, one of said levels being the complement of said other level, and a binary digit character mark formed before and after each coded-character and formed in both levels, said system comprising: manual means for scanning said coded-characters for producing two groups of electric impulses respectively corresponding to the binary digit marks formed in said two levels; first and second storage circuits for respectively storing the two groups of electric impulses therein, each of said first and second storage circuits comprising a plurality of flip-flops arranged in order and being equal in number to two more than the number of binary digits in each coded-character; means for coupling the two groups of electric impulses to respective ones of said first and second storage circuits via the first flip-flop in each; clock means operable by said electric impulses for producing clock pulses to arrange and shift said electric impulses in the flip-flops of said first and second storage circuits in time-spaced order, said clock means including delay means for delaying each clock pulse until after each corresponding electric impulse is coupled to one of said first and second storage circuits; error means for detecting when the stored electric impulses of one circuit is the complement of the stored electric impulses of the other circuit; and means for transferring the impulses representing each character, in turn, out of said first and second storage circuits in response to when said error means indicates that the stored electric impulses in one circuit is the complement of the stored electric impulses in the other circuit.

15. The system of claim 14 wherein said error means comprises means for gating the first state of a flip-flop of each level with the first state of a corresponding flip-flop of the other level in pairs to an AND gate respectively whereby one pair of flip-flops is only gated to an AND gate, said AND gate for each pair of flip-flops between the first and last pair of the series being gated to an OR gate, said AND gate for the last pair of flip-flops being gated with the output of said OR gate to an error AND gate, and the output of said error AND gate being coupled to an error flip-flop whereby when a signal passes through said error AND gate an error signal is produced by said error flip-flop.

16. The system of claim 14 wherein said first and second storage circuits further include means for gating the first and last flip-flops of each level to a first AND gate, the output of said first AND gate being gated to a second AND gate with the output of said clock means and said error means whereby when a signal passes through said first AND gate, said clock means produces a pulse and said error means indicates no error, a signal passes through said second AND gate; and wherein means are provided for gating the output of said second AND gate to said flip-flops, for erasing the information in some of the flip-flops, for shifting the binary code for the code-character being read to a first series of storage flip-flops, and for shifting the information in said first series to a second series of storage flip-flops.

17. In a character reading system, a record medium having a plurality of characters recorded thereon, scanning means for scanning said characters and producing electrical signals corresponding thereto, said scanning means comprising a light source, a lens for focusing the light rays from said light source onto said record medium to form an illuminated spot, a photo diode disposed on the same side of said lens as said light source and spaced from a line passing through said source and the center of said lens, said lens being disposed so that the optical axis of the lens forms an angle with said line and the optical axis of the lens is pointed to the side of said light source opposite the side that said photo diode is disposed so that said illuminated spot is focused by said lens substantially on said photo diode and so that said photo diode produces said electrical signals, and means for storing a group of said electrical signals which group represents a character.

18. In a manually-scanned character reading system, a record medium having a plurality of coded-characters recorded thereon; a manually-operable scanning pen comprising a light source and a lens for focusing the light rays from said light source onto said record medium; two photo diodes for producing electric impulses indicative of said coded-characters being read; two circuits in which said impulses are formed, said photo diodes being disposed to collect the light rays that are reflected back through said lens from said record medium; enclosure means for enclosing said light source, lens, and photo diodes; a guide means for guiding said enclosure means across said record medium; means for manually manipulating said enclosure means along said guide means and across said record medium; first and second storage means for respectively receiving and storing the electric impulses formed in said two circuits such that when said coded-characters are properly read the impulses stored therein will be complementary; said first and second storage means each also storing a like electric impulse indicative of the end of a coded-character; means responsive to said like electric impulse for transferring the stored impulses representing each character, in turn, out of at least one said storage means; detecting means for detecting when the stored electric impulses in one of said storage means is not the complement of the stored electric impulses in the other storage means; and means responsive to said detecting means for preventing the transfer in the event the impulses stored in said first and second storage means are not complementary.

References Cited by the Examiner

UNITED STATES PATENTS

| | | | |
|---|---|---|---|
| 2,518,694 | 8/1950 | Jannopoulo | 253—146.3 |
| 2,782,398 | 2/1957 | West et al. | 235—61.11 |
| 2,931,916 | 4/1960 | Sinn | 340—146.3 |
| 2,932,006 | 4/1960 | Glauberman | 340—146.3 |
| 2,952,008 | 9/1960 | Mitchell et al. | 235—61.12 |
| 2,964,640 | 12/1960 | Wippler | 88—14 |

FOREIGN PATENTS

| | | |
|---|---|---|
| 582,096 | 11/1946 | Great Britain. |

MALCOLM A. MORRISON, *Primary Examiner.*